US008094636B2

(12) United States Patent  
Yamaoka et al.

(10) Patent No.: US 8,094,636 B2  
(45) Date of Patent: Jan. 10, 2012

(54) WIRELESS COMMUNICATION SYSTEM FOR COMMUNICATING VIA WIRELESS LAN

(75) Inventors: Ryouji Yamaoka, Chiba (JP); Tetsuo Yamaoka, legal representative, Chiba (JP); Junji Yamamoto, Tokyo (JP); Seishi Hanaoka, Tokyo (JP); Toshiaki Suzuki, Hachioji (JP); Masashi Yano, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 685 days.

(21) Appl. No.: 12/230,287

(22) Filed: Aug. 27, 2008

(65) Prior Publication Data

US 2009/0059879 A1   Mar. 5, 2009

(30) Foreign Application Priority Data

Aug. 27, 2007  (JP) ................................ 2007-219962

(51) Int. Cl.  
*H04W 4/00*  (2009.01)
(52) U.S. Cl. ........................................................ 370/338
(58) Field of Classification Search .................. 370/328, 370/338, 342  
See application file for complete search history.

(56) References Cited

U.S. PATENT DOCUMENTS

| | | | | |
|---|---|---|---|---|
| 5,613,205 A * | 3/1997 | Dufour | ........................ | 455/440 |
| 6,701,132 B1 | 3/2004 | Fukuzawa et al. | | |
| 6,975,873 B1 * | 12/2005 | Banks et al. | ................ | 455/456.5 |
| 2003/0023761 A1 * | 1/2003 | Jeansonne et al. | ............ | 709/250 |
| 2004/0106379 A1 * | 6/2004 | Zen et al. | .................. | 455/67.11 |
| 2005/0170801 A1 * | 8/2005 | Deolalikar et al. | ......... | 455/226.1 |
| 2006/0030350 A1 * | 2/2006 | Mitchell | ........................ | 455/522 |
| 2006/0223533 A1 * | 10/2006 | Sakata | ........................... | 455/436 |
| 2006/0227045 A1 | 10/2006 | Sheynblat | | |

FOREIGN PATENT DOCUMENTS

| | | |
|---|---|---|
| JP | 08-195754 | 1/1995 |
| JP | 2001-045549 | 7/1999 |
| JP | 2003-169379 | 12/2001 |
| JP | 2004-320473 | 4/2003 |
| JP | 2005-080071 | 9/2003 |
| JP | 2005-229399 | 2/2004 |
| JP | 2006-295643 | 4/2005 |
| WO | WO 2007/081395 | 7/2007 |

OTHER PUBLICATIONS

"e-Japan Priority Policy Program-2004", Jun. 2004, Ministry of Internal Affairs and Communications, 2 pages and translation.  
Joseph Mitola III et al., "Cognitive Radio for Flexible Mobile Multimedia Communications", 1999 IEEE Int. Workshop on Mobile Multimedia Communications Digest, Nov. 1999, pp. 3-10.  
Joseph Mitola III et al., "Cognitive Radio: Making Software Radios More Personal", 1999 IEEE Personal communication, vol. 6, No. 4, pp. 13-18.  
Office Action from Japanese Patent Office mailed Jul. 28, 2009, in Japanese.

* cited by examiner

*Primary Examiner* — Derrick Ferris  
*Assistant Examiner* — Mohammad Anwar  
(74) *Attorney, Agent, or Firm* — Stites & Harbison PLLC; Juan Carlos A. Marquez, Esq.

(57) ABSTRACT

Provided is a wireless communication system, comprising: a base station providing communication by a plurality of communication methods; and a mobile node for communicating with the base station by the plurality of communication methods. The mobile node calculates a first distance between a wireless LAN access point and the mobile node; and judges whether the communication by the wireless LAN is possible by comparing the calculated first distance and a second distance that is a distance within which communication by a wireless LAN is available.

2 Claims, 16 Drawing Sheets

$$|d_1 - d_2| < D < d_1 + d_2$$

3) IN CASE OF $d_2 \gg d_1$ $D \approx d_2$

*D* IS SLIGHTLY LARGER THAN $d_2$

| | INFORMATION FOR JUDGING WHETHER WIRELESS LAN IS AVAILABLE FOR USE |
|---|---|
| 1 | USER'S REQUEST INFORMATION |
| 2 | DISTANCE $d_2$ BETWEEN WIRELESS LAN AP AND EVDO BASE STATION |
| 3 | DISTANCE $d_1$ BETWEEN EVDO BS AND AT |
| 4 | NUMBER OF WIRELESS LAN AP'S |
| 5 | NETWORK CONDITION |
| 6 | MOVING SPEED OF MOBILE NODE |
| 7 | INFORMATION ON APPLICATION IN USE |

*FIG. 10*

| | INFORMATION TO BE CONTAINED IN PAGING SIGNAL |
|---|---|
| 1 | PRIORITY INFORMATION INDICATING NEXT WIRELESS METHOD FOR COMMUNICATION |
| 2 | DISTANCE $d_2$ BETWEEN WIRELESS LAN AP AND EVDO BASE STATION |
| 3 | DISTANCE $d_1$ BETWEEN EVDO BS AND AT |
| 4 | NUMBER OF WIRELESS LAN AP'S |
| 5 | NETWORK CONDITION |

FIG. 11    301

WIRELESS COMMUNICATION SYSTEM FOR COMMUNICATING VIA WIRELESS LAN

CLAIM OF PRIORITY

The present application claims priority from Japanese patent applications JP 2007-219962 filed on Aug. 27, 2007, the content of which is hereby incorporated by reference into this application.

BACKGROUND OF THE INVENTION

This invention relates to a wireless communication system in which one mobile node communicates via a plurality of wireless methods, and more particularly, to a fast switching technology between a plurality of wireless methods and to a cognitive wireless technology for improving a time space utilization efficiency of a radio spectrum.

Currently, a frequency band of equal to or less than 6 GHz (VHF, UHF, and low microwave band), which is suitable for mobile communication systems, is densely used for third generation cellular phones and wireless local area networks (LANs), bringing use of radio waves to an overload situation. Against the backdrop of such a situation, in order to secure a frequency band, which is required for mobile communications and is particularly high in needs, through utilizing the radio waves in the overload situation more effectively and efficiently, such a technology as to realize more sophisticated sharing of the radio waves among a plurality of radio wave utilization systems including mobile communications is sought after.

From a political perspective, "e-Japan Priority Policy Program-2004" (June, 2004) by the IT strategy headquarters of the Ministry of Internal Affairs and Communications describes that "We try to put to practical use by 2011 a wireless communication system that can establish an optimum communication environment by properly judging surrounding radio propagation quality and application requirements and by flexibly selecting a frequency band, a modulation method, a multiplexing method, and the like." Accordingly, a technology for realizing such a system as described above is sought after.

In order to realize those technologies, as described in Mitola, "Cognitive radio for flexible mobile multimedia communications", 1999 IEEE Int. Workshop on Mobile Multimedia Communications Digest (November, 1999) and Mitola, "Cognitive Radio: Making Software Radios More Personal", 1999 IEEE Personal Communication, vol. 6, No. 4 (1999), the idea of "cognitive radio" that recognizes wireless conditions to control resources of a wireless system according to the conditions was presented in 1999. However, with regard to a method for realizing the cognitive radio, there are various types of approaches, and the examinations thereof have been currently conducted.

When communication is performed via a multi-mode wireless system, a base station transmits a beacon signal of a wireless LAN at given intervals, and a mobile node judges whether the mobile node is within a communication area of the wireless LAN (whether wireless LAN is available for use) by receiving the beacon signal. However, the wireless LAN is large in power consumption, and hence, as described in JP 2003-169379 A and JP 08-195754 A, there have been proposed technologies for more efficient power saving, in which a power supply is turned off when the wireless LAN is not used for a predetermined time period or a standby time is controlled. Those technologies employ a method in which the mobile node judges whether the wireless LAN is available for use by receiving the beacon signal. Moreover, JP 2004-320473 A describes a method in which a mobile terminal performs positional detection and, only when the mobile terminal is located in an area, a power supply concerning a transmitting/receiving section of a system is turned on. JP 2006-295643 A describes a method in which, when notification information for indicating absence of a radio LAN base station within a communication possible range is received from a mobile phone base station, no electric power is supplied to a radio LAN communication unit.

SUMMARY OF THE INVENTION

In a system that is provided with a plurality of wireless methods and where the network side determines the wireless method and assigns the wireless method to a mobile node, when the environment is such that radio propagation quality fluctuates due to a large number of mobile nodes continually moving, there is a possibility that, even if a base station has specified the wireless method for the next communication and notified the mobile node of the wireless method, the wireless method concerned is actually unavailable due to the fluctuation of the radio propagation quality. Accordingly, in order to judge whether the mobile node is within the wireless LAN area, the mobile node has to receive a service set identifier (SSID) of a beacon signal, positional information by a global positioning system (GPS), or the like.

In a case of a portable type mobile node, which is driven by limited battery power, it is preferable that battery consumption be reduced as much as possible. Particularly, the wireless LAN is large in power consumption, and hence, there are various types of methods for reducing the power consumption. According to the technologies disclosed in JP 2003-169379 A and JP 08-195754 A, the power supply is turned off when the wireless LAN is not used for a predetermined time period or the standby time is controlled. However, both the methods require a reception operation of a beacon signal, causing the power consumption involved.

According to the method disclosed in JP 2004-320473 A, positional information and moving speed information are obtained by the GPS, whereby the power supply is controlled. Further, according to the method disclosed in JP 2006-295643 A, based on the information from the base station, in the case of absence of the radio LAN base station within the communication possible range, no electric power is supplied. With the method disclosed in JP 2004-320473 A, it is necessary to use a GPS signal, whereas with the method disclosed in JP 2006-295643 A, it is necessary to receive the notification information indicating whether the wireless LAN base station is present.

In both the methods, the communication area is identified using the beacon signal or the positional information by the GPS, and hence, the power is consumed for the reception operation of the beacon signal or the operation of receiving the positional information by the GPS.

It is therefore an object of this invention to provide a mobile communication system for reducing power consumption, in which it is judged whether communication via a wireless LAN is possible by calculating a distance from a wireless LAN access point to a mobile node.

The representative aspects of this invention are as follows. That is, there is provided a wireless communication system, comprising: a base station providing communication by a plurality of communication methods; and a mobile node for communicating with the base station by the plurality of communication methods. The mobile node calculates a first distance between a wireless LAN access point and the mobile node; and judges whether the communication by the wireless LAN is possible by comparing the calculated first distance and a second distance that is a distance within which communication by a wireless LAN is available.

According to the representative embodiments of this invention, the power consumption can be reduced.

BRIEF DESCRIPTION OF THE DRAWINGS

The present invention can be appreciated by the description which follows in conjunction with the following figures, wherein:

FIG. 10 is an explanatory diagram showing information for judging whether the wireless LAN is available for use in accordance with the first embodiment of this invention;

FIG. 11 is an explanatory diagram showing information to be contained in a paging signal from information for judging whether a communication via the wireless LAN is available for use in accordance with the first embodiment of this invention;

DETAILED DESCRIPTION OF THE PREFERRED EMBODIMENTS

Hereinbelow, embodiments of this invention will be described with reference to the drawings.

First Embodiment

A first embodiment of this invention will be described.

Figure 1:
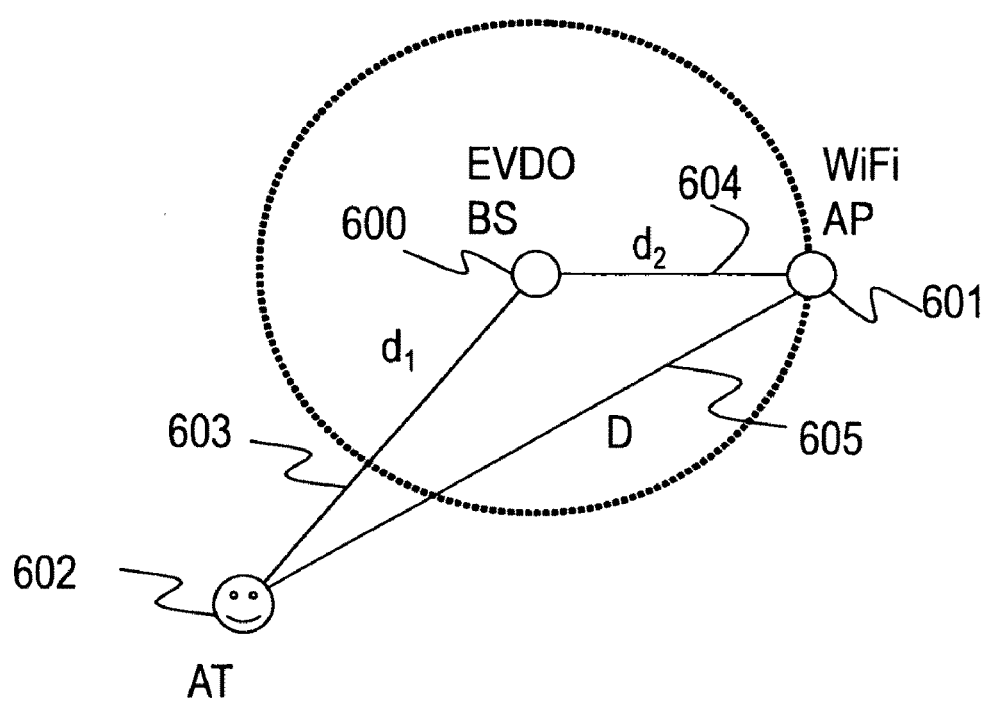
FIG. 1 is an explanatory diagram showing a positional relation between a base station and a mobile node of a multi-mode wireless system in accordance with a first embodiment of this invention.

FIG. 1 is an explanatory diagram showing a positional relation between a base station and a mobile node of a multi-mode wireless system according to the first embodiment of this invention.

According to this embodiment, as shown in FIG. 1, when there are an EVDO base station 600, a wireless LAN access point (AP) 601, and a portable mobile node (AT) 602 in such a multi-mode system, an EVDO signal can reach the mobile node. Accordingly, based on attenuation of a signal strength indicator or a round trip delay (RTD) from the EVDO base station to the mobile node, a distance $d_1$ 603 between the EVDO base station and the mobile node can be obtained. Because a cognitive base station side knows the location of the EVDO base station 600 and the location of the wireless LAN AP 601, a distance $d_2$ 604 between the EVDO base station 600 and the wireless LAN access point 601 can be obtained. Thus, a distance D 605 between the wireless LAN access point and the mobile node can be expressed by the following expression (1-1).

$$|d_1-d_2|<D<d_1+d_2 \qquad (1\text{-}1)$$

Figure 2:
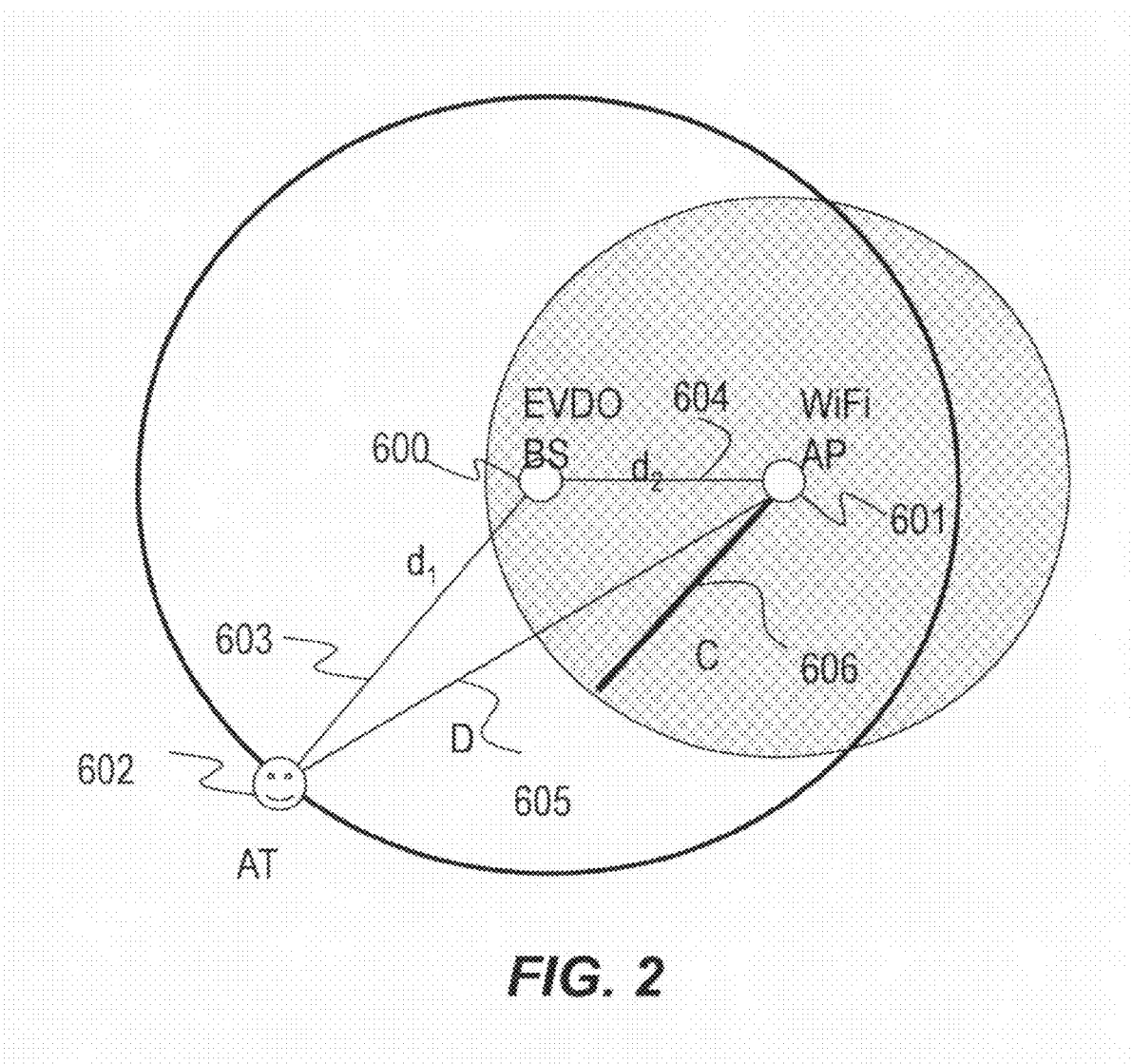
FIG. 2 is an explanatory diagram showing a positional relation between the base station and the mobile node of the multi-mode wireless system in accordance with to the first embodiment of this invention.

FIG. 2 is another explanatory diagram showing the positional relation between the base station and the mobile node of the multi-mode wireless system according to the first embodiment of this invention.

As shown in FIG. 2, based on a value of the signal strength indicator of a signal transmitted from the wireless LAN access point, which is received at the mobile node, a distance C 606 in which communication is available from the wireless LAN AP can be calculated. Inside a circle with a radius C, the mobile node can communicate via the wireless LAN. By comparing the distance C in which the communication via the wireless LAN is available and the distance D 605 from the wireless LAN access point to the mobile node, it is judged whether the communication via the wireless LAN is possible. It should be noted that the distance C 606 in which the communication via the wireless LAN is available is a value independent of the distance $d_1$ 603 between the EVDO base station and the mobile node and of the distance $d_2$ 604 between the EVDO base station and the wireless LAN AP. According to this embodiment, FIG. 2 shows a communication area in which the communication via the wireless LAN is available. If the mobile node is located inside the circle area with the radius C 606, the communication via the wireless LAN is possible.

Figure 3:
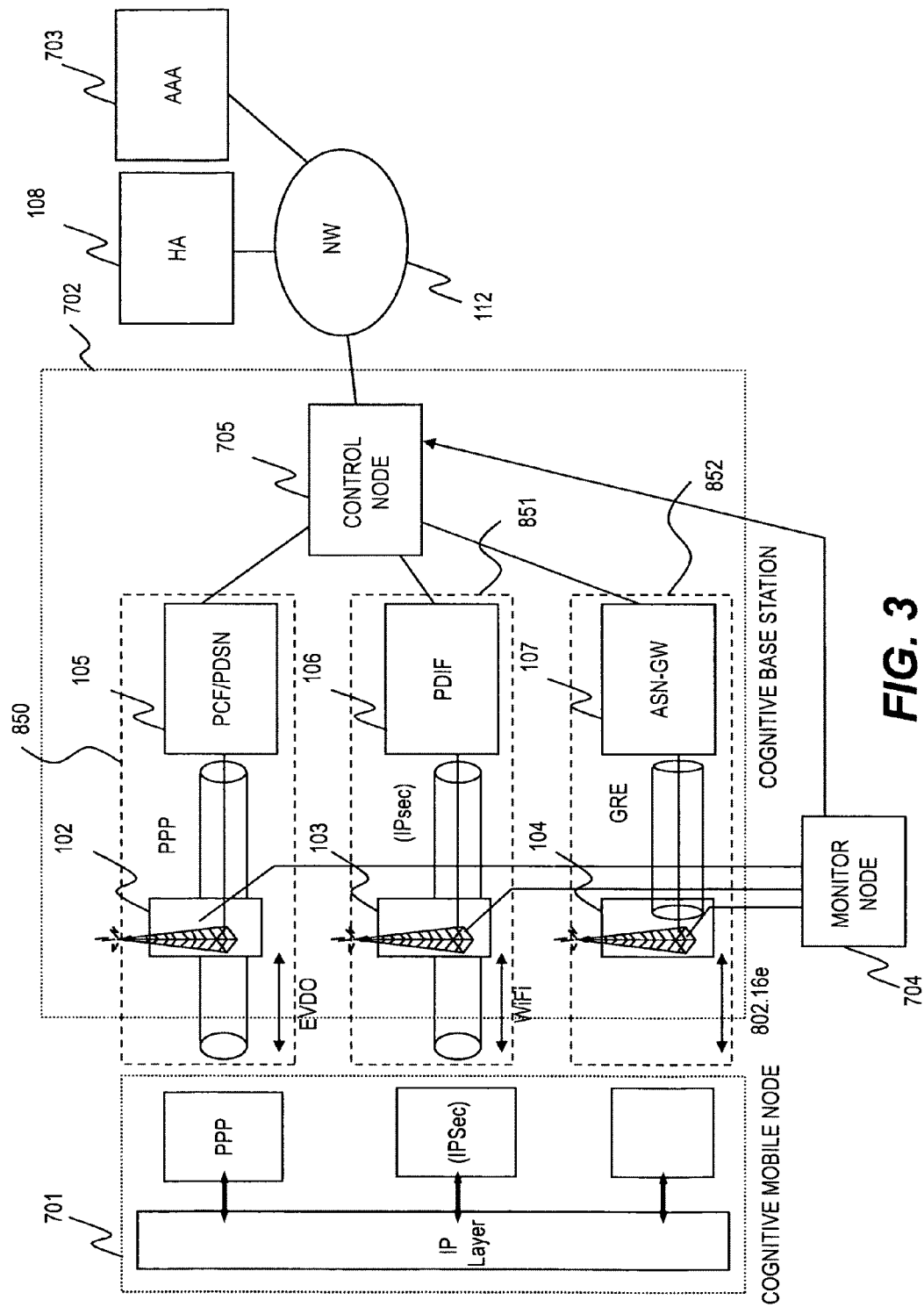
FIG. 3 is an overall configuration diagram of a multi-mode wireless system in accordance with the first embodiment of this invention.

FIG. 3 is an overall configuration diagram of the multi-mode wireless system according to the first embodiment of this invention.

FIG. 3 shows the configuration including the base station and the mobile node of a power saving method that has been described with reference to FIGS. 1 and 2.

In the example shown in FIG. 3, the following three systems are connected: code division multiplex access 1x evolution data only (cdma1x EVDO) as a cellular system; worldwide interoperability for microwave access (WiMAX) as an outdoor broadband system for an urban area; and a wireless local area network (LAN) as a short-distance and indoor broadband system. The power saving method according to this invention is applicable to a system other than the systems described above as long as the system concerned has similar functions.

A communication system according to the first embodiment of this invention includes a cognitive mobile node 701, a cdma2000 EVDO wireless base station 102, a wireless LAN base station 103, a WiMAX wireless base station 104, a gateway device (PDSN: Packet Data Serving Node) 105 of an EVDO wireless system, a gateway device (PDIF: Packet Data Interworking Function) 106 of a wireless LAN system, a gateway device (ASN-GW: Access Serving Network Gateway) 107 of a WiMAX system, a home agent (HA) 108, a certificate authority (AAA) 703, a monitor node 704, and a network 112. A cognitive base station 702 accommodates the cdma2000 EVDO wireless base station 102, the WiMAX wireless base station 104, the PCF/PDSN 105, the PDIF 106, the ASN-GW 107, and the HA 108.

The cognitive base station 702 is provided with the monitor node (CMT: Cognitive Monitoring Tool) 704 to know respective wireless conditions of the different wireless systems, and collects information on wireless conditions (for example, information on condition of each system) from each access point of the systems with use of the monitor node 704. The monitor node 704 collects the information on the wireless conditions from each access point of the systems. For example, in a case of the system being cdma1x EVDO, the monitor node 704 collects the information on the wireless conditions from the EVDO wireless base station 102. In a case of the system being the wireless LAN, the monitor node 704 collects the information on the wireless conditions from the wireless LAN base station 103. In a case of the system being WiMAX, the monitor node 704 collects the information on the wireless conditions from the WiMAX wireless base station 104.

Further, a control node 705 is provided between the gateway device of each wireless system and the network 112. In the case of the system being cdma1x EVDO, the gateway device is the PDSN 105. In the case of the system being the wireless LAN, the gateway device is the PDIF 106. In the case of the system being WiMAX, the gateway device is the ASN-GW 107.

The control node 705 determines priorities of wireless methods for the next communication according to an instruction from the monitor node 704.

The information on the wireless conditions includes at least one of a received power value, a received signal strength indicator (RSSI) value, a throughput of each user, a transmission speed, packet loss, the number of the mobile nodes connected to the access point, a processing load of the access point, and the like. In the case of the system being EVDO, apart from the aforementioned information items, the information on the wireless conditions may include various types of parameter values such as a data rate control (DRC) value and a reverse rate indicator (RRI) value, which are used for scheduling within the wireless zone. Such information items on the wireless conditions are statistically processed by the monitor node 704. In addition to the statistically processed information items on the wireless conditions, spatial information such as the location and the moving direction of the mobile node 701 is also taken into account, whereby the priorities of the wireless methods for the next communication are set.

Figure 4A:
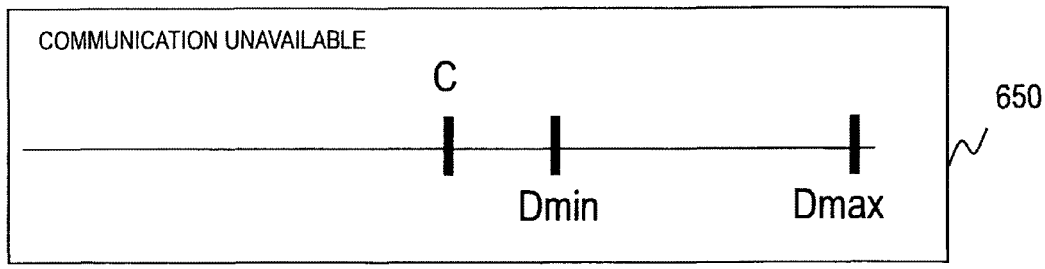
FIGS. 4A to 4C are explanatory diagrams showing relations between a distance within which a communication via the wireless LAN is available and a distance from a wireless LAN access point to the mobile node in accordance with the first embodiment of this invention.
Figure 4B:
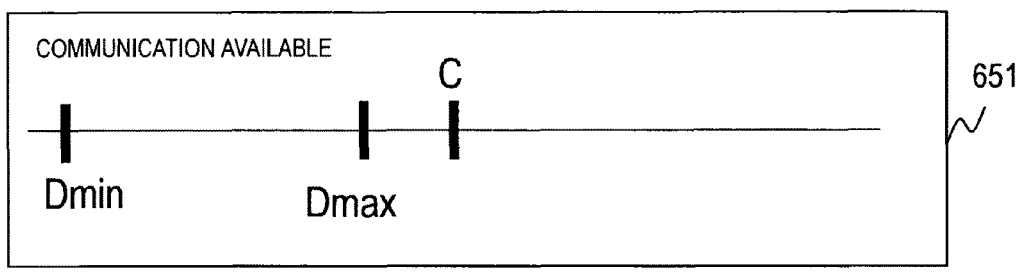
Figure 4C:
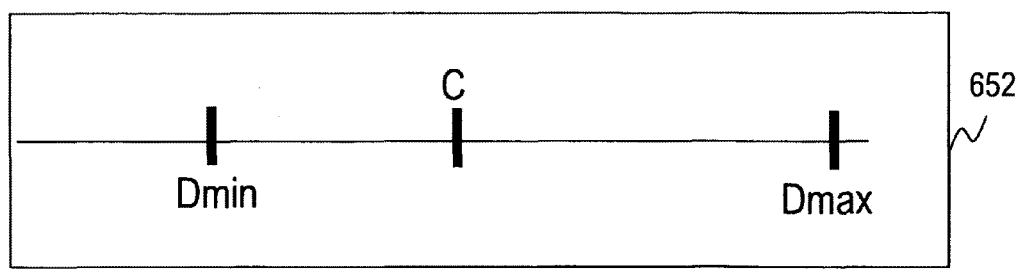

Referring to FIGS. 4A to 4C, the case of comparing the distance C in which the communication via the wireless LAN is available and the distance D from the wireless LAN AP to the mobile node will be described.

FIGS. 4A to 4C are explanatory diagrams showing relations between the distance within which the communication via the wireless LAN is available and the distance from the wireless LAN access point to the mobile node according to the first embodiment of this invention.

In this embodiment, the minimum value and the maximum value that the distance from the wireless LAN AP to the mobile node can take are set as Dmin and Dmax, respectively.

In a case of C<Dmin<Dmax (650), the area in which the mobile node can be located is outside the area in which the communication via the wireless LAN is available, and hence, it can be judged that the communication via the wireless LAN is impossible.

In a case of C>Dmax>Dmin (651), the area in which the mobile node can be located is inside the area in which the communication via the wireless LAN is available, and hence, it can be judged that the communication via the wireless LAN is possible.

In a case of Dmin<C<Dmax (652), based on the values of Dmin and Dmax, it is judged whether the communication via the wireless LAN is possible. In this case, a probability that the mobile node can use the wireless LAN is obtained by (C−Dmin)/(Dmax−Dmin). This expression is for the case of one dimension, and if the movement of the mobile node is taken into account, the probability that the mobile node can use the wireless LAN can be obtained by $\{(C-Dmin)/(Dmax-Dmin)\}^2$.

The mobile node judges, from the value thus obtained, whether the mobile node is within the communication area of the wireless LAN, that is, whether the communication via the wireless LAN is possible. Accordingly, the mobile node does not need to receive a beacon signal for knowing whether the communication via the wireless LAN is possible, thereby realizing more efficient power saving.

Hereinbelow, the details thereof will be described.

Figure 5:
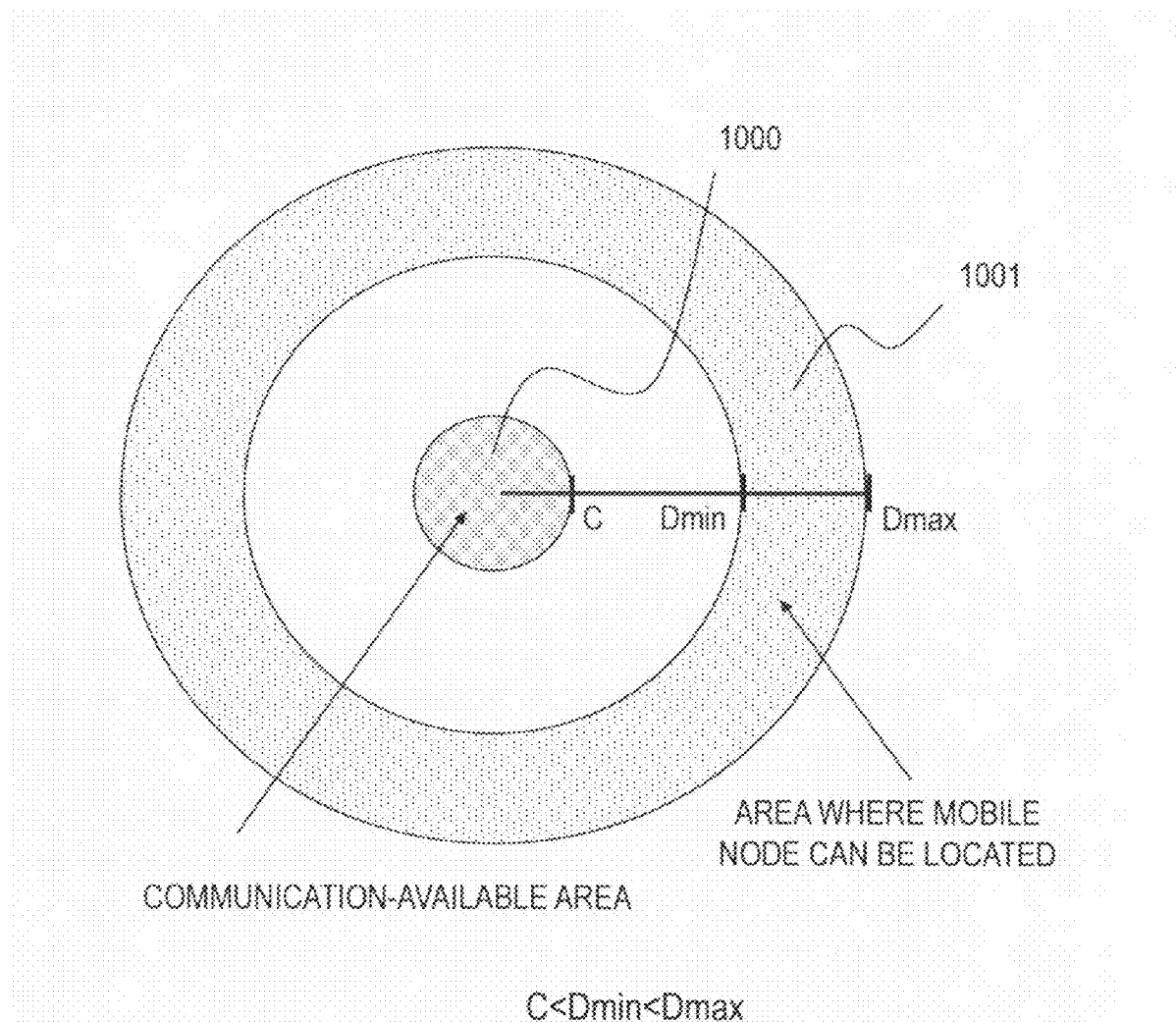
FIG. 5 is an explanatory diagram showing a communication area in which the mobile node is located and an area in which a communication is available in accordance with to the first embodiment of this invention.

Referring to FIG. 5, the case of C<Dmin<Dmax (650) will be described.

FIG. 5 is an explanatory diagram showing the communication area in which the mobile node is located and the area in which the communication is available according to the first embodiment of this invention.

In the case of C<Dmin<Dmax (650), an area 1001 in which the mobile node can be located is outside an area 1000 with the radius C, in which the communication via the wireless LAN is available. Thus, in this case, the communication via the wireless LAN is impossible.

Figure 6:
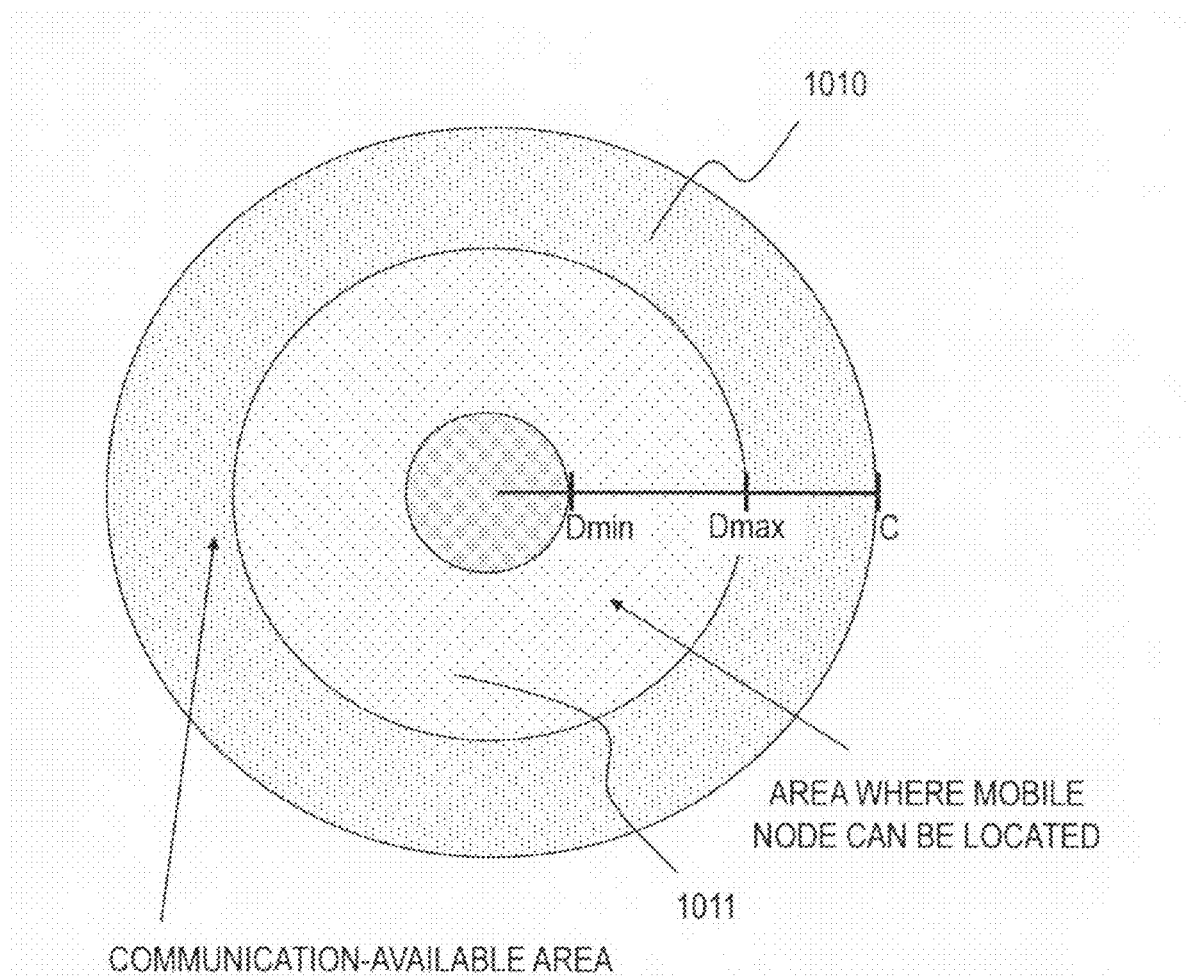
FIG. 6 is an explanatory diagram showing a communication area in which the mobile node is located and the area in which the communication is available in accordance with the first embodiment of this invention.

Referring to FIG. 6, the case of Dmin<Dmax<C (651) will be described.

FIG. 6 is another explanatory diagram showing the communication area in which the mobile node is located and the area in which the communication is available according to the first embodiment of this invention.

In the case of Dmin<Dmax<C (651), an area 1011 in which the mobile node can be located is inside an area 1010 with the radius C, in which the communication via the wireless LAN is available. Thus, in this case, the communication via the wireless LAN is possible.

In the case of Dmin<C<Dmax (652), that is, in the case of $|d_1-d_2|<D<d_1+d_2$, depending on the values of $d_1$ and $d_2$, three cases are conceivable. Hereinbelow, referring to FIGS. 7 to 9, the case of Dmin<C<Dmax (652) will be described.

Figure 7:
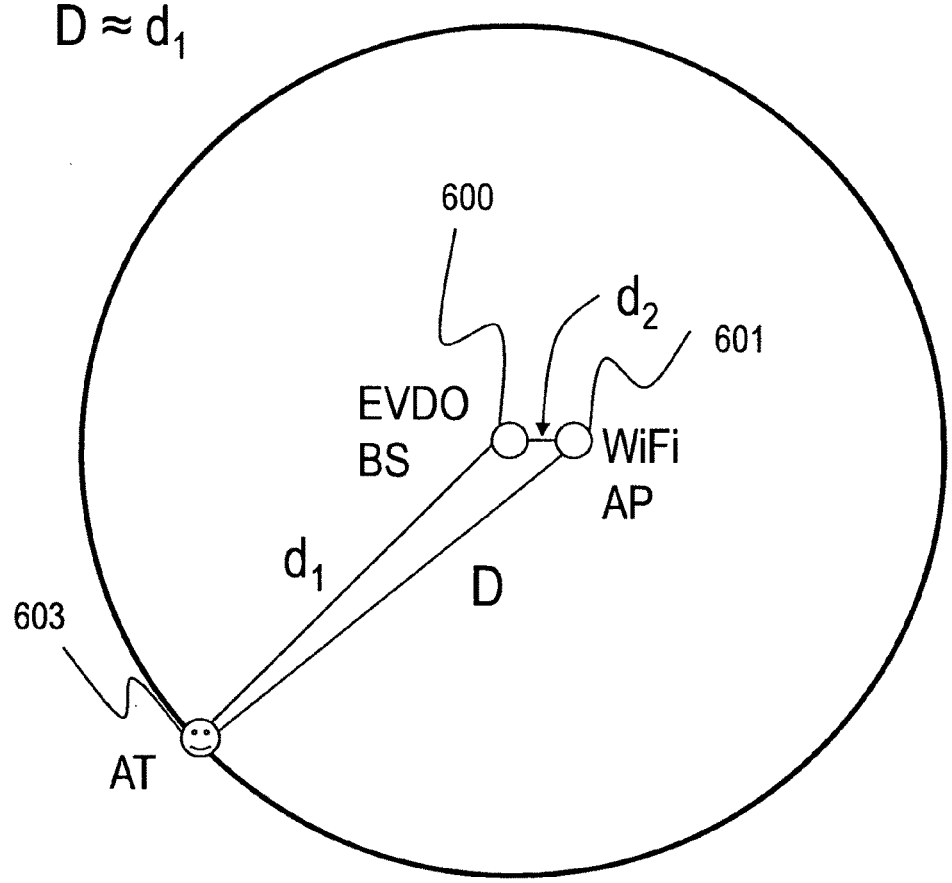
FIG. 7 is an explanatory diagram showing a layout of the base station and the mobile node of the multi-mode wireless system in accordance with the first embodiment of this invention.

FIG. 7 is an explanatory diagram showing a layout of the base station and the mobile node of the multi-mode wireless system according to the first embodiment of this invention.

Referring to FIG. 7, a case of $d_1 \gg d_2$ will be described. In this case, the distance D between the wireless LAN access point 601 and the mobile node 603 takes a value slightly larger than the distance $d_1$ between the EVDO base station 600 and the mobile node 603. In other words, the distance D satisfies $D \approx d_1$. In this case, the value of D is approximately equal to $d_1$, and hence, the value of D can be obtained because $d_1$ is a known value. By comparing the value of D and the distance C in which the communication via the wireless LAN is available, it is judged whether the communication via the wireless LAN is possible.

Figure 8:
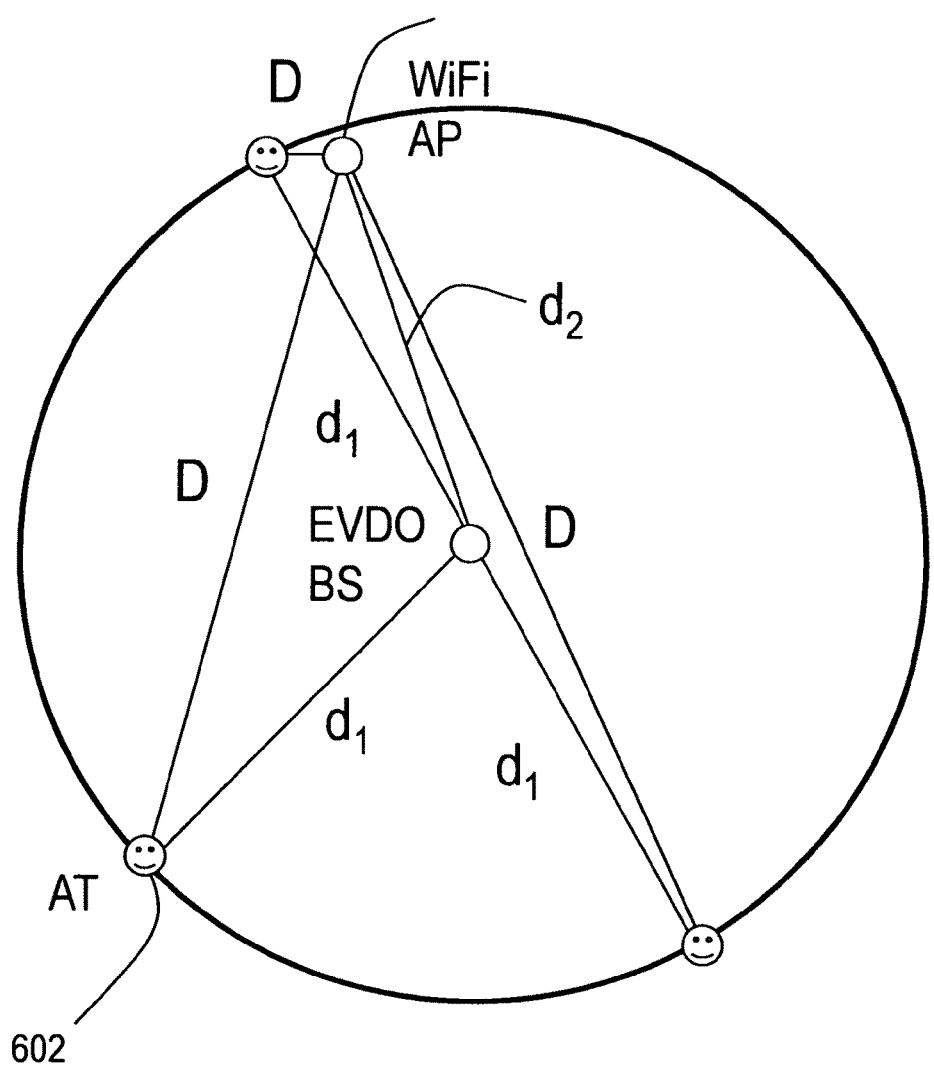
FIG. 8 is an explanatory diagram showing a layout of the base station and the mobile node of the multi-mode wireless system in accordance with the first embodiment of this invention.

FIG. 8 is an explanatory diagram showing another layout of the base station and the mobile node of the multi-mode wireless system according to the first embodiment of this invention.

Referring to FIG. 8, a case of $d_1 \approx d_2$ will be described, and particularly, a case in which $d_1 > d_2$ is satisfied will be described. When the wireless LAN access point and the mobile node are located close to each other, D becomes a small value. When the wireless LAN access point and the mobile node are most separated from each other, D becomes a value approximately equal to $2d_1$. In other words, the value of D ranges from a value approximately equal to 0 to $2d_1$. In this case, due to the wide range of D, it is the most difficult to judge whether the communication via the wireless LAN is possible.

Figure 9:
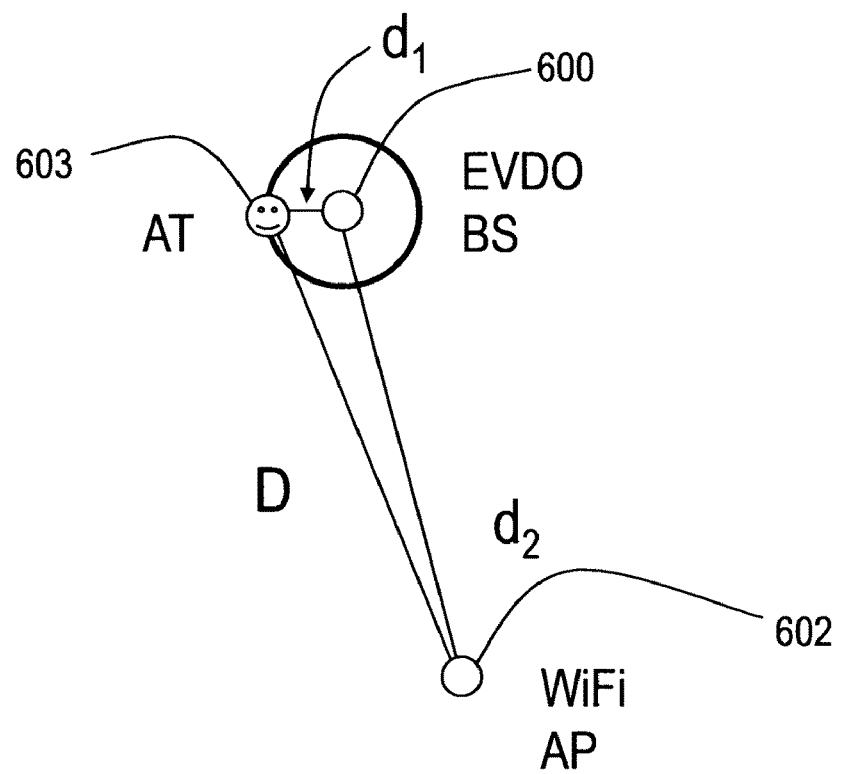
FIG. 9 is an explanatory diagram showing a layout of the base station and the mobile node of the multi-mode wireless system in accordance with the first embodiment of this invention.

FIG. 9 is an explanatory diagram showing yet another layout of the base station and the mobile node of the multi-mode wireless system according to the first embodiment of this invention.

Referring to FIG. 9, a case of $d_2 \gg d_1$ will be described. In this case, the distance D between the wireless LAN access point 601 and the mobile node 603 becomes a value slightly larger than the distance $d_2$ between the wireless LAN access point 601 and the EVDO base station 600. In other words, the distance D satisfies $D \approx d_2$. In this case, the value of D becomes a value approximately equal to $d_2$, and hence, the value D can be obtained because $d_2$ is a known value. By comparing the value of D and the distance C in which the communication via the wireless LAN is available, it is judged whether the communication via the wireless LAN is possible.

FIG. 10 is an explanatory diagram showing information for judging whether the wireless LAN is available for use according to the first embodiment of this invention.

When it is judged whether the communication via the wireless LAN is possible, in addition to comparing an approximate value D of the distance from the wireless LAN AP to the mobile node and the distance C in which the communication via the wireless LAN is available, information 300 as shown in FIG. 10 is used. Specifically, considering such information as user's request information, the distance $d_2$ between the wireless LAN AP and the EVDO base station, the number of the wireless LAN AP's, information on an application in use, the moving speed of the mobile node, and a network condition, it is judged whether the communication via the wireless LAN is possible.

FIG. 11 is an explanatory diagram showing information to be contained in a paging signal from the information for judging whether the communication via the wireless LAN is available for use according to the first embodiment of this invention.

Among the information for judging whether the communication via the wireless LAN is available for use, information 301 shown in FIG. 11 is contained in the paging signal and transmitted from the base station to the mobile node. Specifically, such information items as the distance $d_2$ between the wireless LAN AP and the EVDO base station, the number of the wireless LAN AP's, and the network condition, which are held by the base station, are contained in the paging signal and transmitted from the base station to the mobile node.

Figure 12:
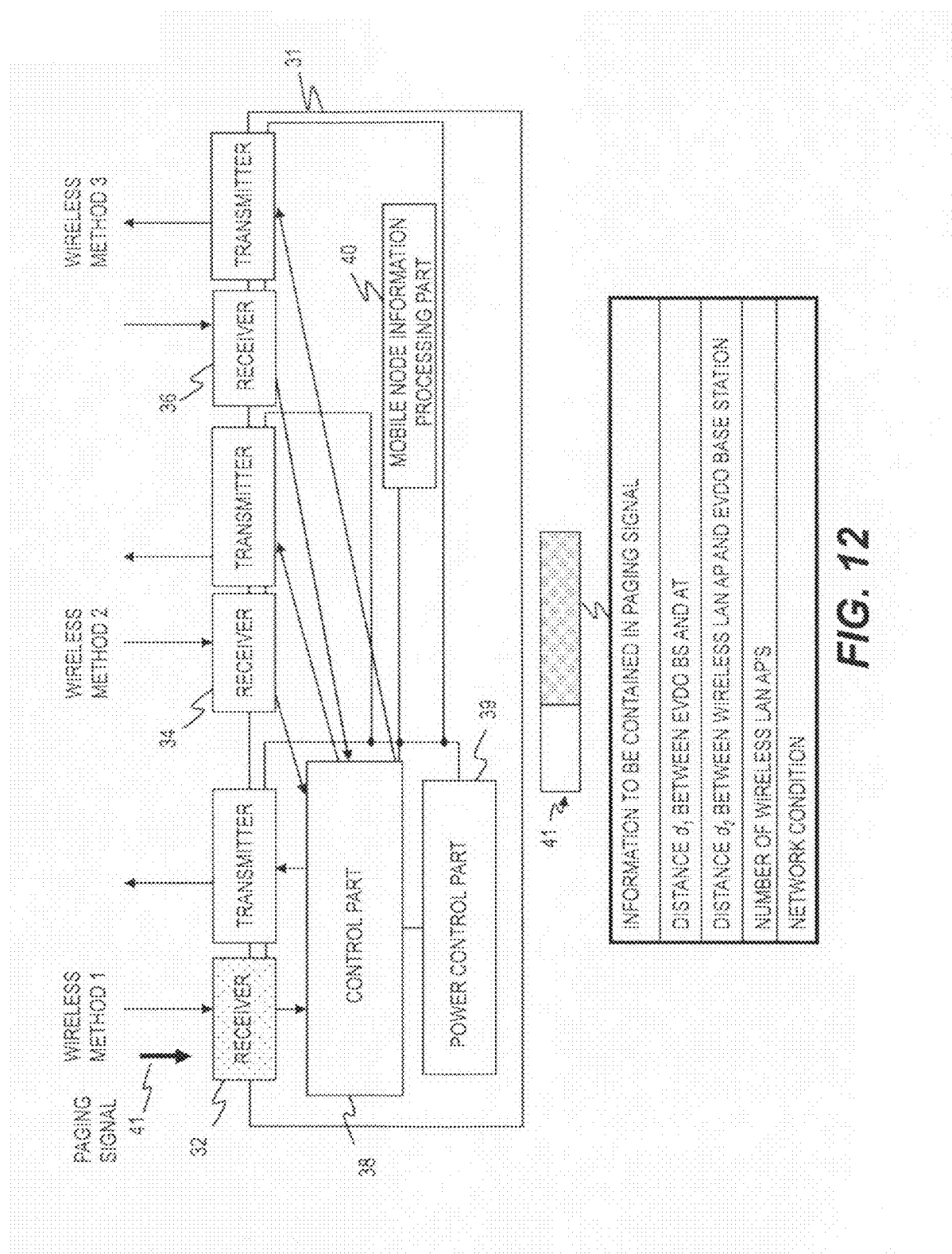
FIG. 12 is a block diagram showing a configuration of a portable device used for the multi-mode wireless system in accordance with the first embodiment of this invention.

FIG. 12 is a block diagram showing a configuration of a portable device used for the multi-mode wireless system according to the first embodiment of this invention.

According to this embodiment, an identifier to which the priorities of the wireless methods to be used next are added and the information shown in FIG. 11 that is held on the network side are added to a paging signal 41 of a wireless method 1, which is transmitted from the base station. The paging signal 41 is received by a receiver 32 of the wireless method 1 of the mobile node. A control part 38 of the wireless method 1 performs data control of a physical layer and a media access control (MAC) layer. Information on the wireless method that the mobile node desires to use is stored in a mobile node information processing part 40. Information on the wireless method that the mobile node can use is sorted by the control part 38 based on information collected from the receiver 32 of the wireless method 1, a receiver 34 of a wireless method 2, and a receiver 36 of a wireless method 3. The control part of the wireless method 1 judges whether the communication via the wireless LAN is possible by comparing the distance D from the wireless LAN access point to the mobile node and the distance C in which the communication via the wireless LAN is available. Further, the control part of the wireless method 1 determines the wireless method for the next communication that is performed by the control part 38. Subsequently, the control part 38 of the wireless method 1 notifies a power control part 39 of the identifier of the wireless method for the next communication. The power control part 39 transmits an activation message that contains the identifier of the wireless method for the next communication and that is directed to the receiver of the wireless method concerned, and sets the receiver in an activated state (state in which power is fully supplied). The power control part 39 transmits sleep messages to the other receivers that do not perform the communication, and sets those receiver in a sleep state (state of operation with required minimum power).

The information to which the identifier regarding the priorities is added is not necessarily transmitted by means of the paging signal 41 of the wireless method 1. The paging signal of the wireless method 2 or the wireless method 3 may be used.

Figure 13:
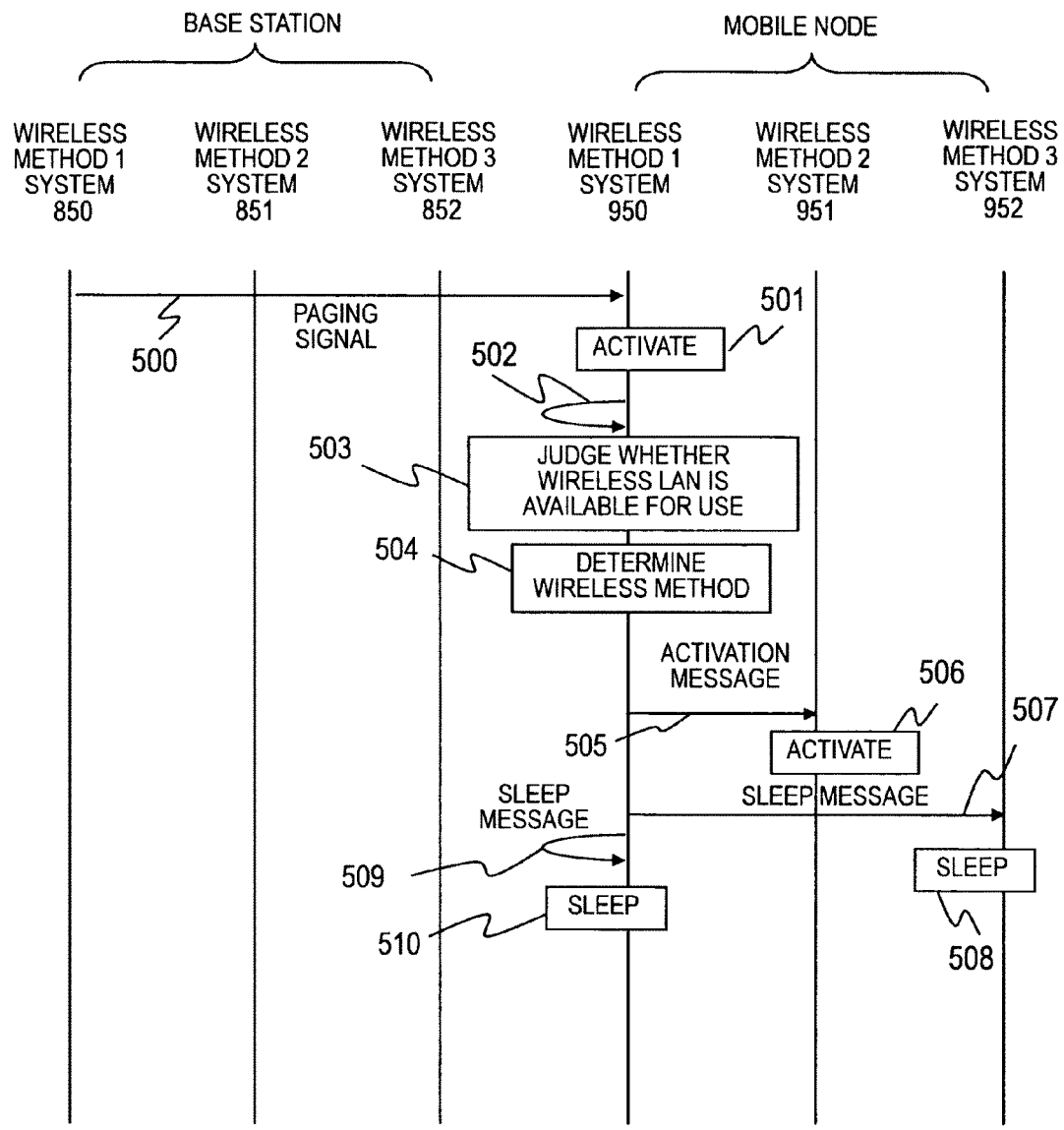
FIG. 13 is a sequence diagram showing processings in accordance with the first embodiment of this invention.

Referring to FIG. 13, communication procedures according to the first embodiment of this invention will be described.

FIG. 13 is a sequence diagram showing processings according to the first embodiment of this invention.

A paging signal 500 is transmitted from a wireless method 1 system 850 of the base station to a wireless method 1 system 950 of the mobile node. Upon reception of the paging signal, the wireless method 1 system 950 of the mobile node enters the activated state (501). The wireless method 1 system 950 of the mobile node receives priority information indicating the wireless method to be used next by means of the paging signal (502). Further, the wireless method 1 system 950 of the mobile node judges whether the wireless LAN is available for use (503), and then determines the wireless method (504).

Next, when it is determined that the communication is performed via the wireless method 2, the wireless method 1 system 950 of the mobile node transmits the activation message to a wireless method 2 system 951 of the mobile node (505), and the wireless method 2 system 951 enters the activated state (506). In addition, the wireless method 1 system 950 transmits the sleep message to a wireless method 3 system 952 (507), and the wireless method 3 system 952 enters the sleep state (508).

Figure 14:
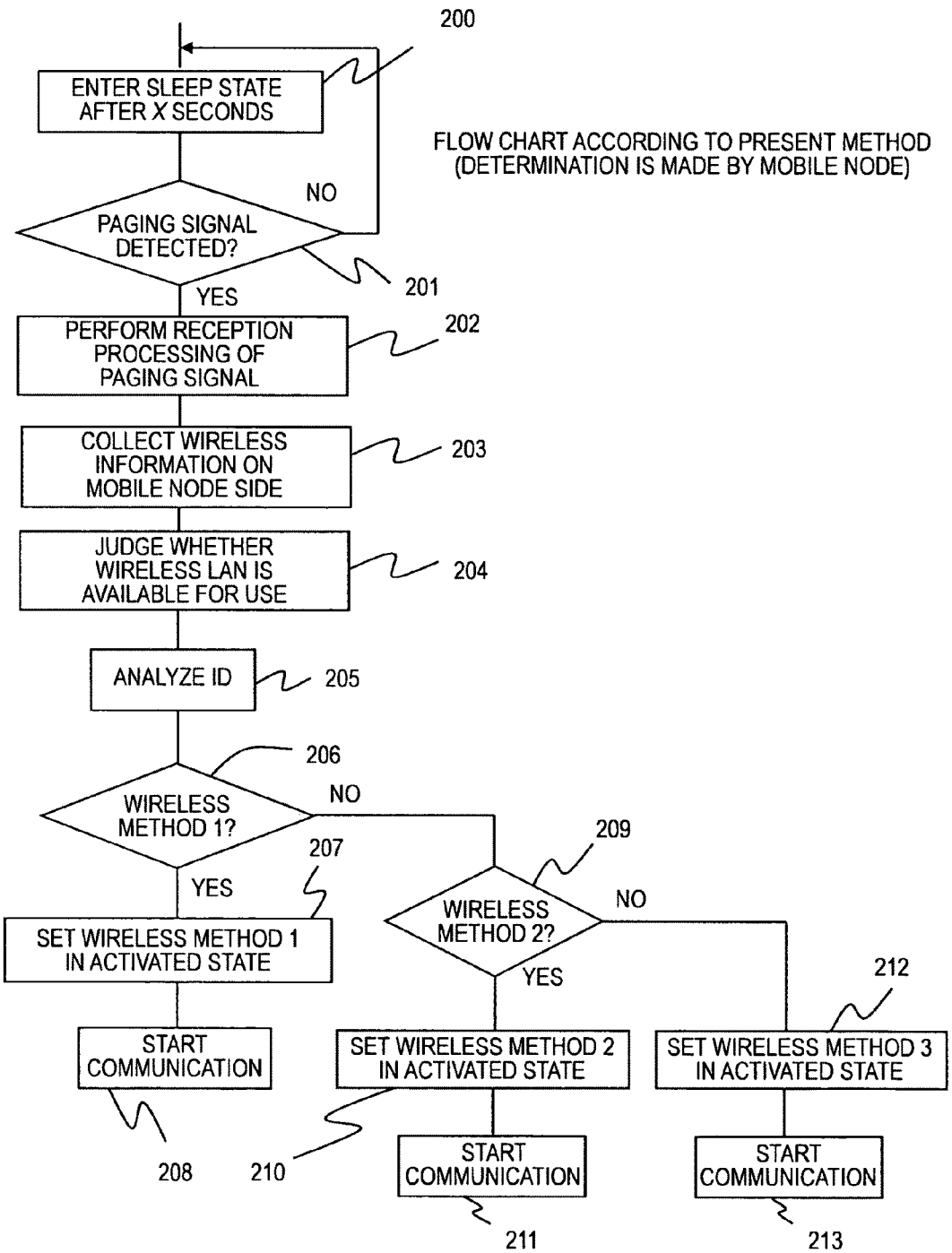
FIG. 14 is a flow chart showing operations of the mobile node in accordance with the first embodiment of this invention.

Next, referring to FIG. 14, operations on the mobile node side will be described. FIG. 14 is a flow chart showing the operations of the mobile node according to the first embodiment of this invention.

If a given period of time has elapsed since the last communication, the mobile node enters the sleep state (200). Then, the mobile node waits for the paging signal containing the priorities of the wireless methods for the next communication, which is transmitted from the base station (201). As a result of this, when the paging signal is not detected, the mobile node enters the sleep state again (200). When the paging signal is detected, the mobile node performs a paging signal reception processing (202).

Subsequently, the information on the wireless conditions is collected on the mobile node side (203), and it is judged whether the wireless LAN is available for use (204). The mobile node analyzes the identifier of the paging signal containing the priorities of the wireless methods for the next communication (205), and, based on the information on whether the wireless LAN is available for use, determines the wireless method for the next communication.

Subsequently, it is judged whether the information of the determined wireless method specifies the wireless method 1 (206). When the wireless method 1 is specified, the wireless method 1 is set in the activated state (207), and the communication is started (208). On the other hand, when the wireless method 1 is not specified, it is judged whether the wireless method 2 is specified (209). When the wireless method 2 is specified, the wireless method 2 is set in the activated state (210), and the communication is started (211). On the other hand, when the wireless method 2 is not specified, the wireless method 3 is set in the activated state (212), and the communication is started (213).

Second Embodiment

According to the aforementioned first embodiment of this invention, the mobile node side determines the wireless method for the next communication. On the other hand, according to a second embodiment of this invention described below, the mobile node side transmits information on whether communication via the wireless LAN is possible to the base station side, and the base station side determines the wireless method for the next communication.

Figure 15:
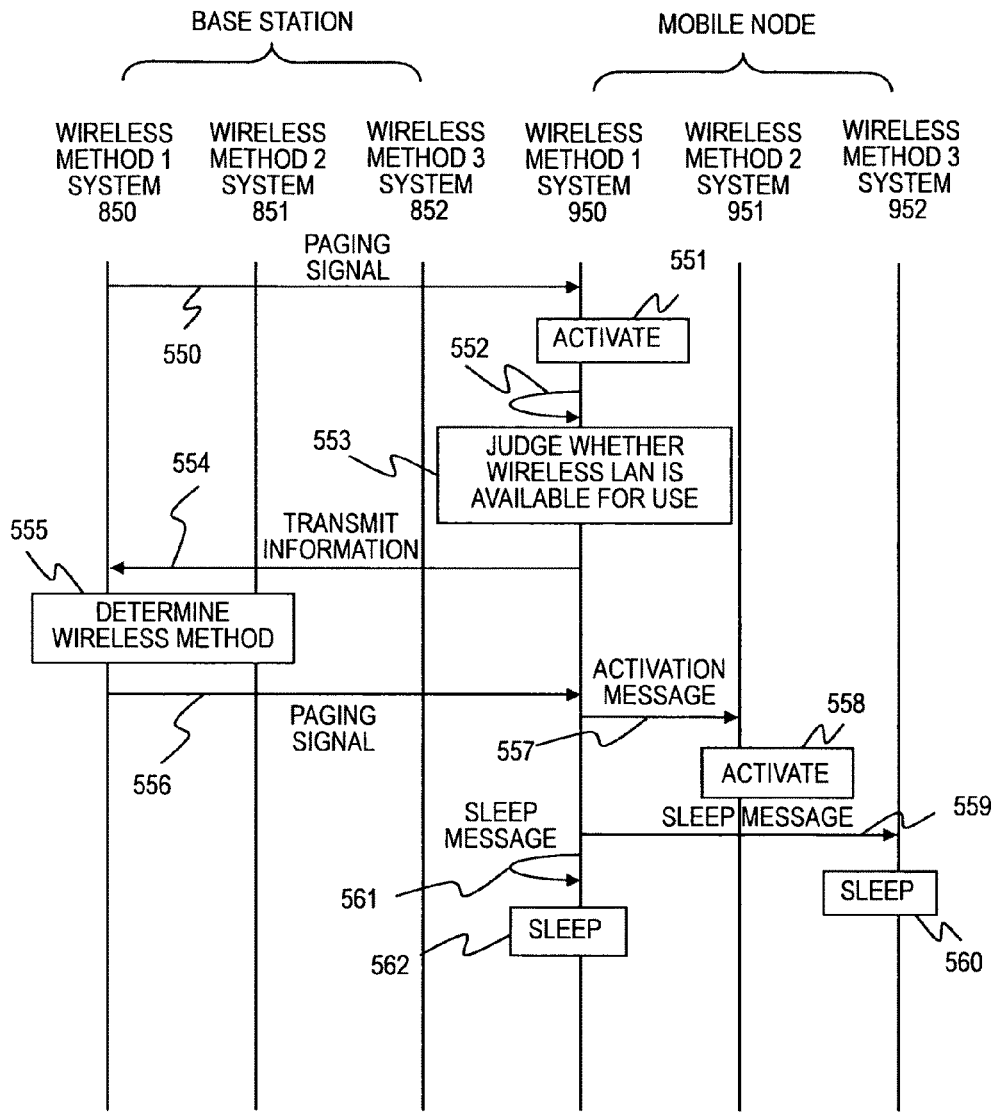
FIG. 15 is a sequence diagram showing processings in accordance with a second embodiment of this invention.

Referring to FIG. 15, communication procedures according to the second embodiment of this invention will be described. FIG. 15 is a sequence diagram showing processings according to the second embodiment of this invention.

A paging signal 550 is transmitted from the wireless method 1 system 850 of the base station to the wireless method 1 system 950 of the mobile node. Upon reception of the paging signal 550, the wireless method 1 system 950 of the mobile node enters an activated state (551). Further, the wireless method 1 system 950 of the mobile node judges whether the wireless LAN is available for use (553), and then transmits the information thereon to the wireless method 1 system 850 of the base station (554).

The wireless method 1 system 850 of the base station determines the wireless method for the next communication (555), and puts the information thereon to a paging signal 556, thereby transmitting the paging signal to the wireless method 1 system 950 of the mobile node.

When it is determined, based on the identifier of the paging signal 556, that the communication is performed via the wireless method 2, the wireless method 1 system 950 of the mobile node transmits an activation message to the wireless method 2 system 951 (557), and the wireless method 2 system 951 enters the activated state (558). In addition, the wireless method 1 system 950 of the mobile node transmits a sleep message to the wireless method 3 system 952 (559), and the wireless method 3 system 952 enters a sleep state (560).

Figure 16:
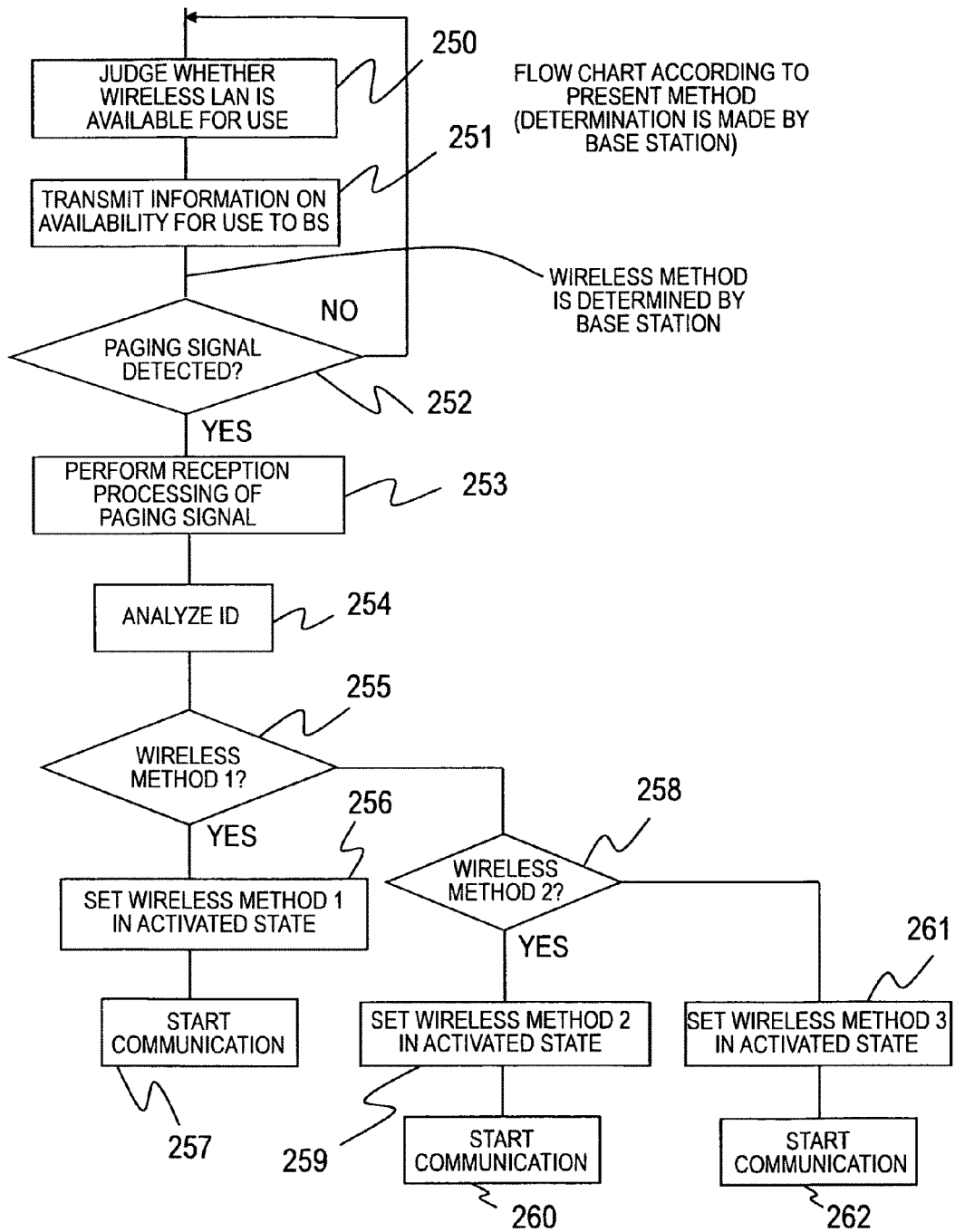
FIG. 16 is a flow chart showing operations of the mobile node in accordance with the second embodiment of this invention.

Next, referring to FIG. 16, operations on the mobile node side will be described. FIG. 16 is a flow chart showing the operations of the mobile node according to the second embodiment of this invention.

The mobile node side judges whether the wireless LAN is available for use (250), and transmits the information thereon to the base station side (251). Then, the base station side determines the wireless method.

Next, the mobile node waits for the paging signal indicating the wireless method for the next communication, which is transmitted from the base station (252). As a result of this, when the paging signal is detected, a paging signal reception processing is performed (253), and the identifier of the wireless method contained in the paging signal is analyzed (254). It is judged whether the information on the determined wireless method specifies the wireless method 1 (255). When the wireless method 1 is specified, the wireless method 1 is set in the activated state (256), and the communication is started (257). On the other hand, when the wireless method 1 is not specified, it is judged whether the wireless method 2 is specified (258). When the wireless method 2 is specified, the wireless method 2 is set in the activated state (259), and the communication is started (260).

On the other hand, when the wireless method 2 is not specified, the wireless method 3 is set in the activated state (261), and the communication is started (262).

According to the representative embodiments of this invention, based on the distance D from the wireless LAN access point to the mobile node, the mobile node judges whether the wireless LAN is available for use. In addition, taking into account such information as a user's request, an application in use, a network condition, and a moving speed of the mobile node, a ratio that serves as a reference for judging whether the wireless LAN is available for use is changed. With this configuration, it can be determined whether the mobile node is inside the communication area of the wireless LAN. Accordingly, there is no need to receive a beacon signal, thereby realizing more efficient power saving.

While the present invention has been described in detail and pictorially in the accompanying drawings, the present invention is not limited to such detail but covers various obvious modifications and equivalent arrangements, which fall within the purview of the appended claims.

What is claimed is:

1. A wireless communication system, comprising:
   a base station providing communication by at least one communication method other than wireless LAN; and
   a mobile node for communicating with the base station by the at least one communication method,
   wherein the mobile node is configured to:
   obtain a first distance between the base station and a wireless LAN access point that is calculated by the base station based on a location of the wireless LAN access point and a location of the base station;
   calculate a minimum value and a maximum value of a second distance between a wireless LAN access point and the mobile node based on the first distance and a third distance between the base station and the mobile node, the third distance being calculated based on one of a received signal strength indicator and a delay time of a signal that is transmitted from the base station;

calculate a probability that the mobile node is within a communication area of the wireless LAN access point based on a fourth distance within which communication by a wireless LAN is available and the calculated minimum and maximum values of the second distance when the fourth distance is between the calculated minimum and maximum values of the second distance;

judge whether communication by the wireless LAN is possible based on the calculated probability; and activate a communication by the by the wireless LAN upon judging that communication by the wireless LAN is available.

2. A mobile node for communicating with a base station by at least one communication method other than wireless LAN, the base station providing communication by the at least one communication method other than wireless LAN, the mobile node comprising:

a control part configured to:

obtain a first distance between the base station and a wireless LAN access point that is calculated by the base station based on a location of the wireless LAN access point and a location of the base station;

calculate a minimum value and a maximum value of a second distance between a wireless LAN access point and the mobile node based on the first distance and a third distance between the base station and the mobile node, the third distance being calculated based on one of a received signal strength indicator and a delay time of a signal that is transmitted from the base station;

calculate a probability that the mobile node is within a communication area of the wireless LAN access point based on a fourth distance within which communication by a wireless LAN is available and the calculated minimum and maximum values of the second distance when the fourth distance is between the calculated minimum and maximum values of the second distance;

judge whether communication by the wireless LAN is possible based on the calculated probability; and activate a communication by the by the wireless LAN upon judging that communication by the wireless LAN is available.

* * * * *